United States Patent
Kam et al.

(10) Patent No.: US 10,270,253 B2
(45) Date of Patent: Apr. 23, 2019

(54) SYSTEM AND METHOD FOR REGULATING THE REACTIVE POWER FLOW OF ONE OR MORE INVERTERS COUPLED TO AN ELECTRICAL GRID

(71) Applicant: Gridco, Inc., Woburn, MA (US)

(72) Inventors: Anthony Kam, Arlington, MA (US); James Simonelli, Grafton, MA (US)

(73) Assignee: Varentec, Inc., Santa Clara, CA (US)

( * ) Notice: Subject to any disclaimer, the term of this patent is extended or adjusted under 35 U.S.C. 154(b) by 190 days.

(21) Appl. No.: 14/712,318

(22) Filed: May 14, 2015

(65) Prior Publication Data

US 2016/0336753 A1 Nov. 17, 2016

(51) Int. Cl.
| | |
|---|---|
| H02J 1/00 | (2006.01) |
| H02J 3/38 | (2006.01) |
| H02J 3/16 | (2006.01) |
| H02J 3/50 | (2006.01) |

(52) U.S. Cl.
CPC ............. *H02J 3/383* (2013.01); *H02J 3/16* (2013.01); *H02J 3/50* (2013.01); H02J 3/386 (2013.01); Y02E 10/563 (2013.01); Y02E 10/763 (2013.01); Y02E 40/34 (2013.01)

(58) Field of Classification Search
CPC .. H02J 3/383; H02J 3/50; Y02E 40/34; Y02E 10/563
USPC .......................................................... 307/82
See application file for complete search history.

(56) References Cited

U.S. PATENT DOCUMENTS

| | | | |
|---|---|---|---|
| 5,041,959 A | 8/1991 | Walker | |
| 6,909,622 B2 | 6/2005 | Weng | |
| 6,924,565 B2 | 8/2005 | Wilkins et al. | |
| 7,095,597 B1 | 8/2006 | Cousineau | |
| 7,119,452 B2 | 10/2006 | Larsen | |
| 7,166,928 B2 | 1/2007 | Larsen | |
| 7,224,081 B2 | 5/2007 | Larsen | |
| 7,531,911 B2 | 5/2009 | Rivas et al. | |
| 7,923,862 B2 | 4/2011 | Cardinal et al. | |

(Continued)

FOREIGN PATENT DOCUMENTS

| | | |
|---|---|---|
| CN | 202435056 U | 9/2012 |
| CN | 103545847 A | 1/2014 |

(Continued)

OTHER PUBLICATIONS

Arritt et al., Distribution System Analysis and the Future Smart Grid, IEEE Transactions on Industry Applications, Nov./Dec. 2011, pp. 2343-2350, vol. 47, No. 6, http://ieeexplore.ieee.org/stamp/stamp.jsp?tp=&arnumber=6025285.

(Continued)

*Primary Examiner* — Jared Fureman
*Assistant Examiner* — Duc M Pham
(74) *Attorney, Agent, or Firm* — Sheppard Mullin Richter & Hampton LLP (57) ABSTRACT

A system for regulating reactive power flow of one or more inverters coupled to an electrical grid. The system includes one or more voltage regulators coupled between a voltage output of a feeder of the electrical grid and one or more inverters configured to generate or consume reactive power as a function of observed voltage. The one or more voltage regulators is configured to provide one or more output control voltages to control reactive power flow of the one or more inverters.

35 Claims, 9 Drawing Sheets

(56) References Cited

U.S. PATENT DOCUMENTS

| | | |
|---|---|---|
| 8,295,989 B2 | 10/2012 | Rettger et al. |
| 8,427,009 B2 | 4/2013 | Shaver, II et al. |
| 8,487,634 B2 | 7/2013 | Masters et al. |
| 2005/0135031 A1* | 6/2005 | Colby ................. H02J 3/42 361/78 |
| 2007/0228838 A1 | 10/2007 | Delmerico et al. |
| 2010/0134076 A1 | 6/2010 | Cardinal et al. |
| 2010/0198420 A1 | 8/2010 | Rettger et al. |
| 2010/0223180 A1 | 9/2010 | Kremen |
| 2011/0273917 A1 | 11/2011 | Maitra et al. |
| 2012/0161523 A1 | 6/2012 | Kim et al. |
| 2012/0205981 A1* | 8/2012 | Varma ................. H02J 3/01 307/64 |
| 2013/0006436 A1 | 1/2013 | Masters et al. |
| 2013/0131878 A1 | 5/2013 | Wilkins et al. |
| 2013/0173078 A1* | 7/2013 | Divan ................. G05F 5/00 700/295 |
| 2013/0207622 A1 | 8/2013 | Yuan et al. |
| 2013/0294110 A1 | 11/2013 | Eyales |
| 2014/0046500 A1* | 2/2014 | Varma ................. G05F 1/66 700/298 |
| 2014/0229031 A1 | 8/2014 | Amarin et al. |
| 2014/0232357 A1* | 8/2014 | Huomo ................. H02J 3/1892 323/205 |
| 2014/0249688 A1 | 9/2014 | Ansari et al. |
| 2015/0340870 A1* | 11/2015 | Ilo ................. H02J 4/00 307/24 |

FOREIGN PATENT DOCUMENTS

| | | |
|---|---|---|
| CN | 103762616 A | 4/2014 |
| WO | 2014067557 A1 | 5/2014 |

OTHER PUBLICATIONS

Smith et al., Smart Inverter Volt/Var Control Functions for High Penetration of PV on Distribution Systems, IEEE, 2011, pp. 1-6, http://ieeexplore.ieee.org/stamp/stamp.jsp?tp=&arnumber=5772598.

Trabish, Herman K., Utility Dive, Smart Inverters: The secret to integrating distributed energy onto the grid? Utilities and research teams are taking distributed energy solutions to the wires., Jun. 4, 2014, pp. 1-5, http://www.utilitydive.com/news/smart-inverters-the-secret-to-integrating-distributed-energy-onto-the-grid/269167/.

* cited by examiner

SYSTEM AND METHOD FOR REGULATING THE REACTIVE POWER FLOW OF ONE OR MORE INVERTERS COUPLED TO AN ELECTRICAL GRID

FIELD OF THE INVENTION

This invention relates to a system and method for regulating the reactive power flow of one or more inverters coupled to an electrical grid.

BACKGROUND OF THE INVENTION

Reactive power control has been widely deployed to enhance power quality and voltage profile, and to minimize loss, in an electric grid. Until now, the deployed solutions, such as capacitor banks owned by the utility operating the network, are either fixed or manually switched or automatically switched on a slow time-scale. Recently, there have been proposals to perform reactive power control automatically on a faster time-scale (seconds). One leading motivation is to utilize a certain type of inverters which generate or consume reactive power as a function of observed voltage. Such inverters may be found in variable power sources, e.g., solar, wind, and the like, to help correct the rapid voltage fluctuations on the distribution feeders of the electrical grid introduced by these same variable power sources.

One proposal to perform reactive power control faster and automatically is the recent Rule 21 draft from the California Public Utility Commission (CPUC). This proposal uses a closed-loop control philosophy where the voltage observed by the inverter determines the reactive power output (of the inverter), which in turn influences the voltage observed by the inverter (as well as voltages at other locations on the same feeder network).

While such a closed-loop control technique represents a direct attempt to solve the problem of voltage fluctuations on the various feeders of the electrical grid there are several potential problems which may be associated with this proposed method.

First, as with any closed feedback loop, there exists the possibility of instability. Specifically, in reaction to an observed voltage value V1, the inverter might output a reactive power value $Q_1$, which causes the observed voltage to change to value V2, which forces the inverter to output a reactive power value $Q_2$, which causes the voltage to change to value V3, and the like. There is no inherent guarantee that the sequence will converge to a stable equilibrium, and indeed various academic studies have shown the possibility of instability, where the sequence of voltages V1, V2, V3, etc., oscillate wildly. This may be especially worrisome in the case where the feeder of the electrical grid network contains a multitude of inverters, all performing its own feedback control while being oblivious of each other, but each of them affecting voltages seen by other inverters due to the inherent nature of reactive power flow. In a related phenomenon, even when the voltages ultimately settle down to equilibrium, the convergence time might be too slow (e.g. many seconds or even minutes).

Second, the inverters may be part of solar and wind generators which may be owned by customers of the electrical grid utility, e.g. residential roof-top solar panels, third-party owned wind/solar forms, and the like. While the utility operating the distribution feeder network has some control over what devices can be admitted (connected) to the network, such control is not perfect, especially given the expected diversity of hardware manufacturers of solar and wind generators. As a result, the utility cannot predict the precise behavior of the reactive power output of the inverters which are part of the solar and wind generators. A similar problem exists for commercial and industrial systems which utilize similar type inverters which generate or consume reactive power as a function of observed voltage. Thus, the utility cannot predict the equilibrium state of the network (assuming equilibrium will be reached), and cannot make confident guarantees on power quality, voltage level, and the like, which are necessary for regulatory compliance.

Third, by definition, a feedback loop based on observed voltage will only attempt to ameliorate voltage level problems. Traditionally, reactive power control is also used to improve power quality, minimize line loss, and the like, and these objectives remain important to the utility operating the electrical grid. Since the proposed control loop by CPUC does not use power quality measurements, e.g., as reactive current, power factor, and the like, as inputs, by definition it will have unpredictable effects on power quality and line loss. In some feeders and some operating conditions, the voltage-based feedback loop may happen to improve power quality and line loss, whereas in other feeders and other operating conditions, the voltage-based feedback loop may worsen power quality and line loss.

Clearly, from the perspective of a utility of an electrical grid, it would be ideal to be able to control the reactive power of inverters which generate or consume reactive power as a function of observed voltage—even if the inverters are not owned by the utility. Such control would need to be fast, stable, predictable, and precise. Then, the utility could employ any desired algorithm to determine the reactive power output levels in order to optimize any desired combination of voltage compliance, power quality, line loss, and the like.

BRIEF SUMMARY OF THE INVENTION

In one aspect, a system for regulating reactive power flow of one or more inverters coupled to an electrical grid is featured. The system includes one or more voltage regulators coupled between a voltage output of a feeder of the electrical grid and one or more inverters configured to generate or consume reactive power as a function of observed voltage. The one or more voltage regulators is configured to provide one or more output control voltages to control reactive power flow of the one or more inverters.

In one embodiment, the one or more inverters may be non-responsive to reactive power commands. The one or more voltage regulators may be configured to set its respective one or more output control voltages to one or more predetermined voltages to control the reactive power flow of the one or more inverters. The system may include a communication subsystem configured to communicate the one or more predetermined voltages to the one or more voltage regulators. The one or more predetermined voltages may be communicated to the communication subsystem by an electrical grid control center. The one or more voltage regulators may be configured to set the one or more output control voltages based on a reactive power flow measurement at one or more points of the feeder to control the reactive power flow of the one or more inverters. The system may include a communication subsystem configured to communicate one or more desired values or desired ranges of values of the reactive power flow to the one or more voltage regulators. The one or more desired values or desired ranges of values of the reactive power flow may be communicated to the communication subsystem by an electrical grid control center. The one or more voltage regulators may be configured to iteratively adjust the one or more output control voltages based on a series of reactive power flow measurements at one or more points of the feeder to control the reactive power flow of the one or more inverters. The one or more voltage regulators may be configured to increase the one or more output control voltages such that one or more of the one or more inverters consumes reactive power, consumes more reactive power, or generates less reactive power. The one or more voltage regulators may be configured to lower the one or more output control voltages such that one or more of the one or more inverters generates reactive power, generates more reactive power, or consumes less reactive power. The one or more voltage regulators may be configured to increase the one or more output control voltages such that one or more of the one or more inverters generates reactive power, generates more reactive power, or consumes less reactive power. The one or more voltage regulators may be configured to lower the one or more output control voltages such that one or more of the one or more inverters consumes reactive power, consumes more reactive power, or generates less reactive power. The feeder may include a secondary feeder. The feeder may include a distribution feeder. The feeder may include a high voltage feeder. The one or more voltage regulators may include a low voltage regulator. The one or more voltage regulators may include a medium voltage regulator. The one or more voltage regulators may include a high voltage regulator. The one or more voltage regulators may include a computer subsystem configured to set the output control voltage.

In another aspect, a method executed on one or more processors for regulating the reactive power flow of one or more inverters coupled to an electrical grid is featured. The method includes receiving a voltage output from an electrical grid, and converting the voltage output to one or more output control voltages to control the reactive power flow of one or more inverters configured to generate or consume reactive power as a function of the output control voltage.

In one embodiment, the one or more inverters may be non-responsive to reactive power commands. The method may include setting the one or more output control voltages to one or more predetermined voltages to control reactive power flow of the one or more inverters. The method may include communicating the one or more predetermined voltages to the one or more voltage regulators. The one or more predetermined voltages may be communicated by an electrical grid control center. The method may include setting the one or more predetermined voltages based on a reactive power flow measurement at one or more points of the electrical grid to control reactive power flow of the one or more inverters. The method may include communicating one or more desired values or desired ranges of values of the reactive power flow to the one or more voltage regulators. The one or more desired values or desired ranges of values of reactive power flow may be communicated by an electrical grid control center. The method may include iteratively adjusting the one or more output control voltages based on a series of reactive power flow measurements at one or more points of the electrical grid to control the reactive power of the one or more inverters. The method may include increasing the one more output control voltages such that one or more of the one or more inverters consumes reactive power, consumes more reactive power, or generates less reactive power. The method may include lowering the one or more output control voltages such that one or more of the one or more inverters generates reactive power, generates more reactive power, or consumes less reactive power. The method may include increasing the one or more output control voltages such that one or more of the one or more inverters generates reactive power, generates more reactive power, or consumes less reactive power. The method may include lowering the output control voltage such that one or more of the one or more inverters consumes reactive power, consumes more reactive power, or generates less reactive power.

In yet another aspect, a method for regulating the reactive power flow of one or more inverters coupled to an electrical grid is featured. The method includes one or more programs, wherein the one or more programs are stored in a memory and configured to be executed by one or more processors. The programs include instructions to receive a voltage output from an electrical grid, and convert the voltage output to the one or more output control voltages to control the reactive power flow of one or more inverters configured to generate or consume reactive power as a function of the output control voltage.

In yet another aspect, a computer program product having program code stored on a non-transitory computer-readable medium, which when executed by at least one computing device causes at least one computing device to generate instructions to receive a voltage output from an electrical grid, and convert the voltage output to the one or more output control voltages to control the reactive power flow of one or more inverters configured to generate or consume reactive power as a function of the output control voltage.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
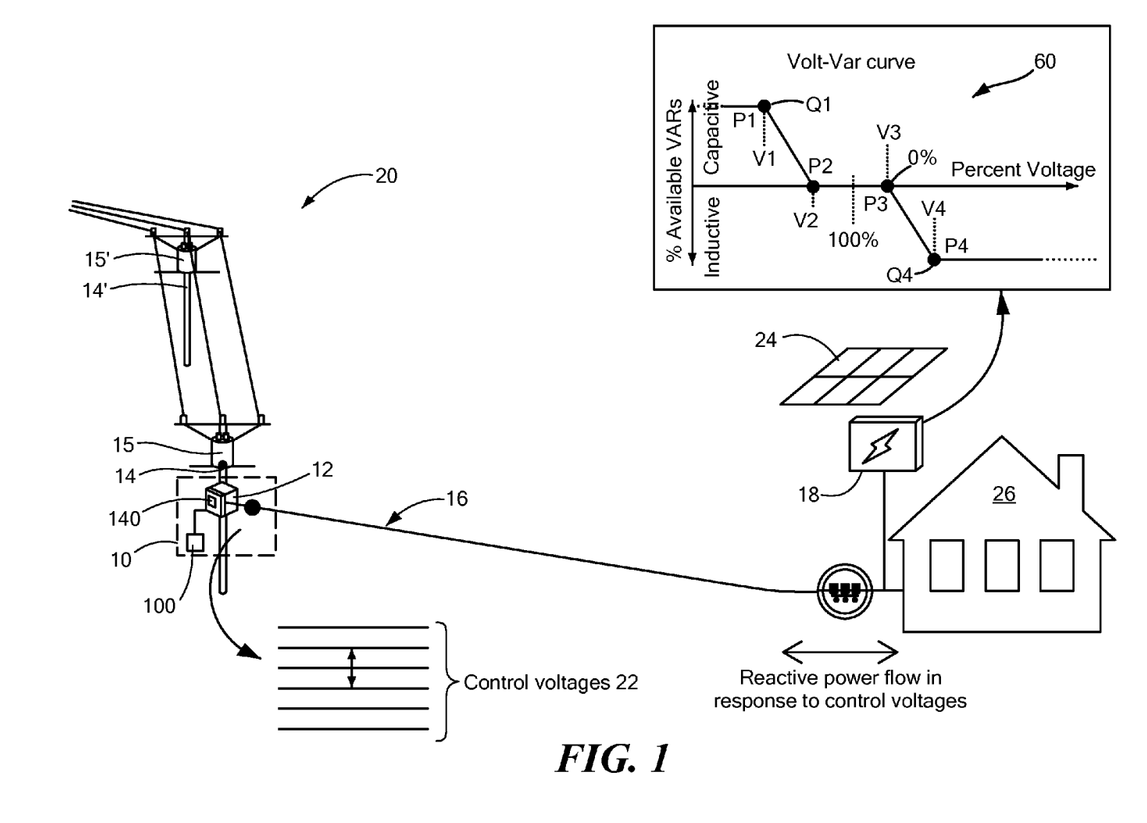
FIG. 1 is a schematic block diagram showing primary components of one embodiment of the system and method for regulating the reactive power flow of one or more inverters coupled to an electrical grid in accordance this invention.

There is shown in FIG. 1 one embodiment of system 10 for regulating reactive power flow of one or more inverters coupled to an electrical grid. System 10 includes one or more voltage regulators 12 coupled between the voltage output of a feeder of an electrical grid and one or more inverters configured to generate or consume power as a function of observed voltage. For example, system 10 may include voltage regulator 12 coupled between voltage output 14 of transformer 15 of secondary feeder 16 and one or more inverters 18. As will be discussed below, secondary feeder 16 is part of electrical grid 20, shown in greater detail in FIG. 2 below, typically operated and/or owned by an electrical utility company. One or more inverters 18, FIGS. 1-2, generate or consume reactive power as a function of observed voltage, as discussed in the Background section above. One or more inverters 18 may be found in variable power sources, e.g., when one or more inverters 18 is coupled to photovoltaic panel 24, or photovoltaic panel 39, FIG. 2, wind turbine (not shown), which may generate electrical power for use by electrical grid 20. The variable power source with one or more inverters 18 are often owned by household 26 or other commercial & industrial entities 35, FIG. 2, or utility scale distributed generation (DG) 37 and therefore are not under the control of the utility company which operates and/or owns electrical grid 20. As discussed above, variable power sources that include one or more inverters 18 that generate or consume reactive power as a function of observed voltage may create rapid voltage fluctuations on the various feeders of electrical grid 22 if the reactive power generated or consumed by one or more inverters 18 is not controlled.

To mitigate this problem, voltage regulator 12 of system 10, FIG. 1, is configured to provide one or more output control voltages 22 to a feeder of electrical grid 20, in this example, secondary feeder 16, to control reactive power flow of one or more inverters 18.

Preferably, one or more inverters 18 are non-responsive to reactive power commands. What this means is that one or more inverters 18 are not under the control or responsive to reactive power commands from a utility which operates and/or owns electrical grid 20.

To clarify electrical grid 20 and the various feeders associated with electrical grid 20 to which system 10 may be coupled to, a general discussion of electrical grid 20 will now be discussed with reference to FIG. 2. In this example, electrical grid 20 includes high voltage feeder 30 which is directly coupled to power generation plant 32. Power from high voltage feeder 30 is transmitted to primary substation 34. Distribution feeder 36 is coupled to primary substation 34 and connects to secondary feeders 16 as shown. Secondary feeder 16 may include residential households 26 with one or more inverters 18 coupled to photovoltaic panel 24 indicated at 33 and commercial and industrial buildings which may utilize one or more inverters 18, indicated at 35. Distribution feeder 36 may also include one or more utility scale distributed generation (DG), indicated at 37 with variable power sources including one or more inverters 18, photovoltaic panel 39 and/or wind turbine 41. Depending on the scale, the utility scale DG 37 may be located on secondary feeder 16 or the distribution feeder 36.

Figure 2:
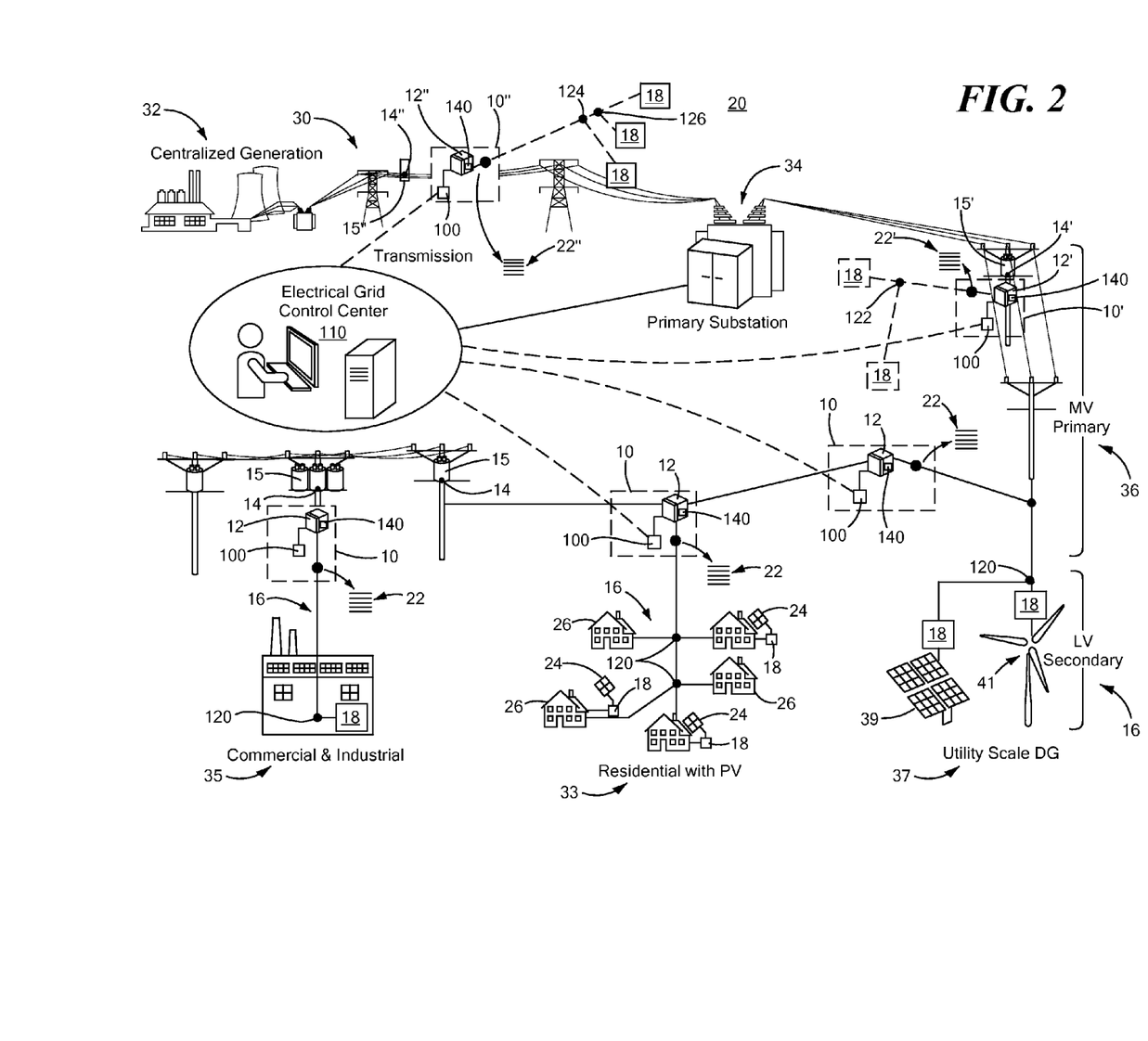
FIG. 2 is a schematic block diagram showing examples of the system and method for regulating the reactive power flow of one or more inverters shown in FIG. 1 coupled to various feeders of an electrical grid.
Figure 3:
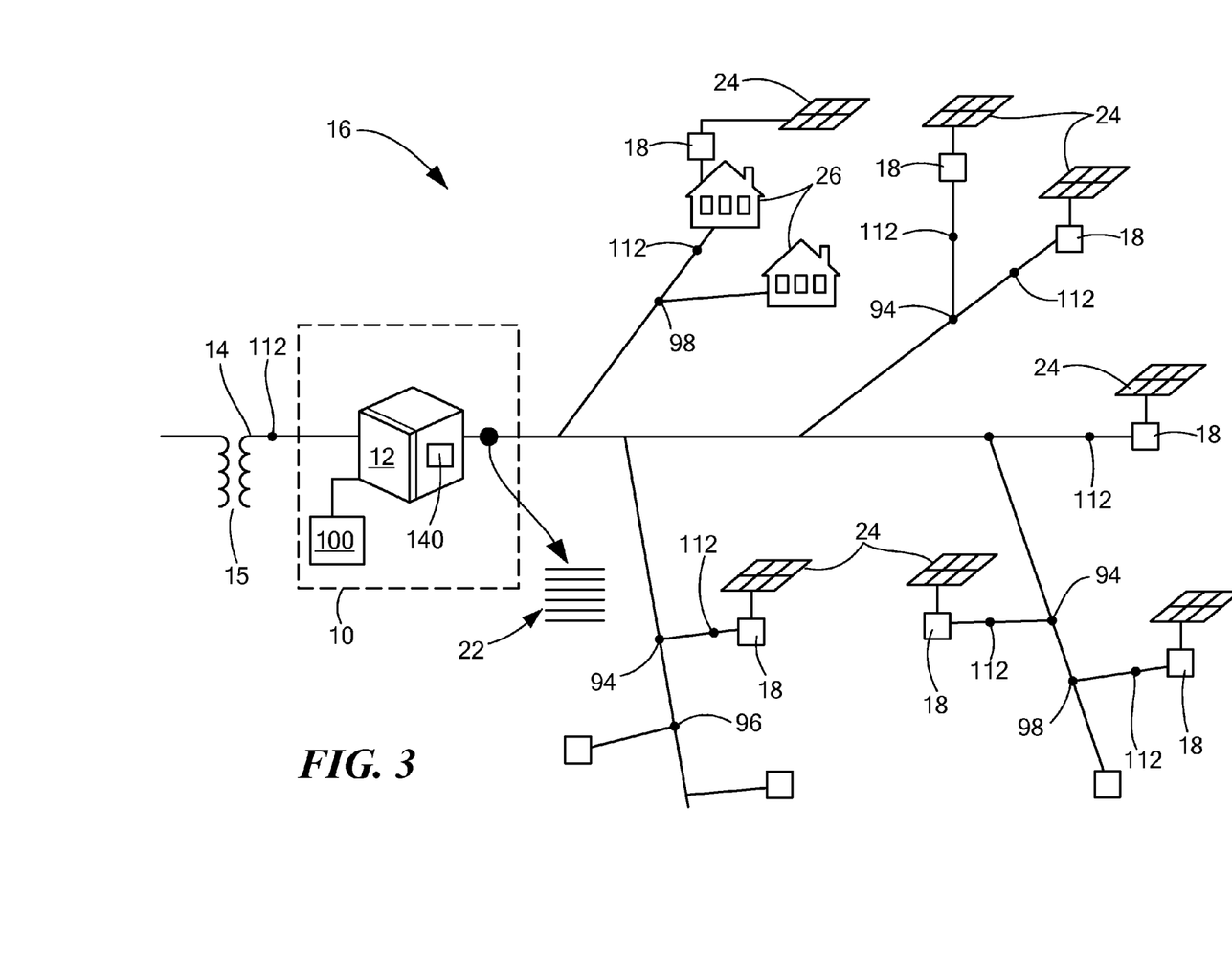
FIG. 3 is a schematic block diagram showing examples of combinations of inverters and other devices coupled to a secondary feeder shown in FIGS. 1 and 2.

FIG. 3, where like parts have been given like numbers, shows in further detail one example of system 10 and secondary feeder 16 shown in FIGS. 1-2 which may include one or more inverters 18 at multiple nodes, e.g., nodes 94, FIG. 3, nodes that do not include inverters 18, e.g., nodes 96, or nodes that have a combination of inverters and devices that are not inverters, e.g., nodes 98. High voltage feeder 30, FIGS. 1-2, and distribution feeder 36 may have similar structures. Electrical grid 20, FIG. 2, typically includes many high voltage, distribution, and secondary feeders 16.

FIGS. 1-3 show examples of system 10 with voltage regulator 12 coupled to secondary feeder 16. In one embodiment, voltage regulator 12 is a low voltage regulator, e.g., for regulating voltages up to about 1 kV, e.g., in-line power regulator, such as a LV IPR-50 Pole, LV IPR-50 Pad, OR LV IPR-150 available from the assignee hereof, Gridco, Inc., Woburn, Mass. 01801. In another example, voltage regulator 12 may be LVR series voltage regulator (Microplanet, Woodinville, Wash.), a LVRSys series voltage regulator (A. Eberle GmbH, Nuremberg, Germany), or a Gridcon transformer series in combination with Gridcon ITAP (Maschinenfabrik Reinhausen, Regensburg, Germany). In another example, system 10', FIG. 2, may include voltage regulator 12' coupled between voltage output 14' of transformer 15' of distribution feeder 36 and one or more inverters 18. Voltage regulator 12' is similarly configured to generate one or more output control voltages 22' to control the reactive power flow of one or more inverters 18. In this example, voltage regulator 12' is a medium voltage regulator e.g., for regulating voltages in the range of about 1 kV to about 69 kV, e.g., a VR-32 series voltage regulator with CL-7 regulator control (Cooper, Cleveland, Ohio), or a VR-SS and VR-PM series voltage regulator (General Electric, Markham, Ontario, Canada). In yet another example, system 10" may include voltage regulator 12" coupled between high voltage output 14" of transformer 15" and one or more inverters 18. Voltage regulator 12" is similarly configured to generate one or more output control voltages 22" to control the reactive power flow of one or more inverters 18. In this example, voltage regulator 12" is a high voltage regulator e.g., for regulating voltages above about 69 kV, as known by those skilled in the art.

Voltage regulators 12, 12', 12", FIGS. 1-3, may be broadly classified as two types: tap-based voltage regulators and power electronics based regulators.

Figure 4:
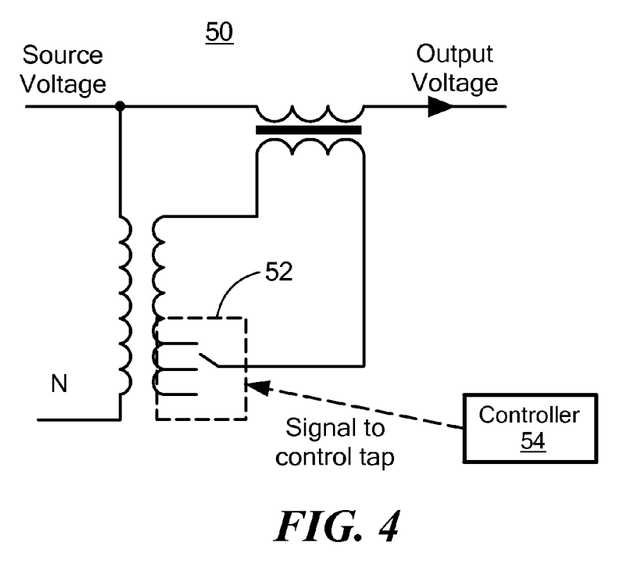
FIG. 4 is a schematic block diagram showing one example of a tap-based voltage regulator which may be used for one or more of the voltage regulators shown in FIGS. 1-3.

Tap-based regulators include physical taps on the transformer coils and the voltage is regulated, preferably in discrete steps by moving the taps. See FIG. 4 which shows an example of tap-based voltage regulator 50 with taps 52 and controller 54 which sends signals to taps 52 as shown.

Figure 5:
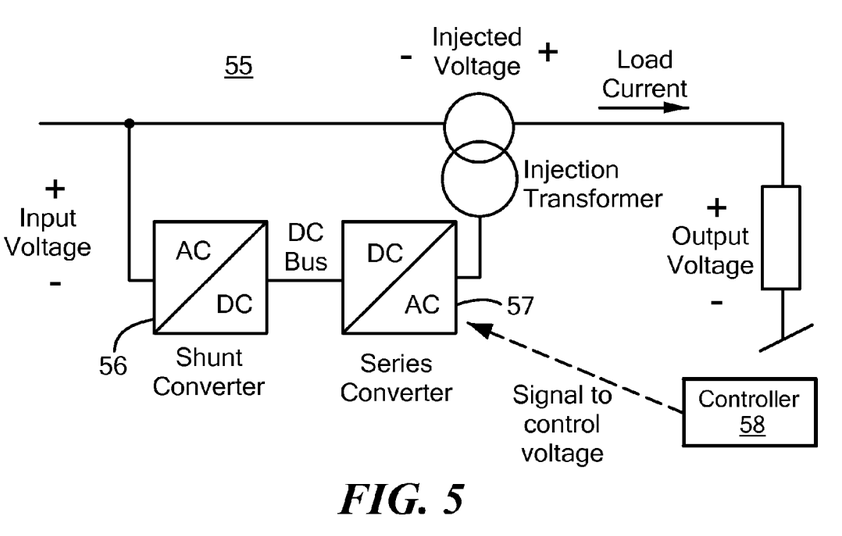
FIG. 5 is a schematic block diagram showing an example of power-electronics based voltage regulator that may be used for one or more of the voltage regulators shown in FIGS. 1-3.

Power-electronics based voltage regulators use power-electronics components, e.g., AC/DC converters or DC/AC converters as the main components to regulate voltage. See, e.g., FIG. 5 which shows an example of power-electronics based voltage regulator 55 with AC/DC converter 56, DC/AC converter 57, and controller 58 which sends signals to one or more of converters 56, 57, as shown. Thus, one or more of voltage regulators 12, 12', 12" as discussed above may be a tap-based voltage regulator or a power-electronics based regulator. Exemplary one or more output control voltages 22, 22', 22", FIGS. 1-3, output by voltage regulators 12, 12', and 12" are preferably 95% to 105% of the nominal voltage. The nominal voltage itself may vary a lot depending on the electrical system. For example, for low voltage systems, some common values would be about 240 V, 277 V, or 480 V. For medium voltage systems, some common values would be about 2400 V, 4800 V, or 7200 V. For high voltage systems, some common values would be about 115 kV, 138 kV, 161 kV, 230 kV.

Figure 6:
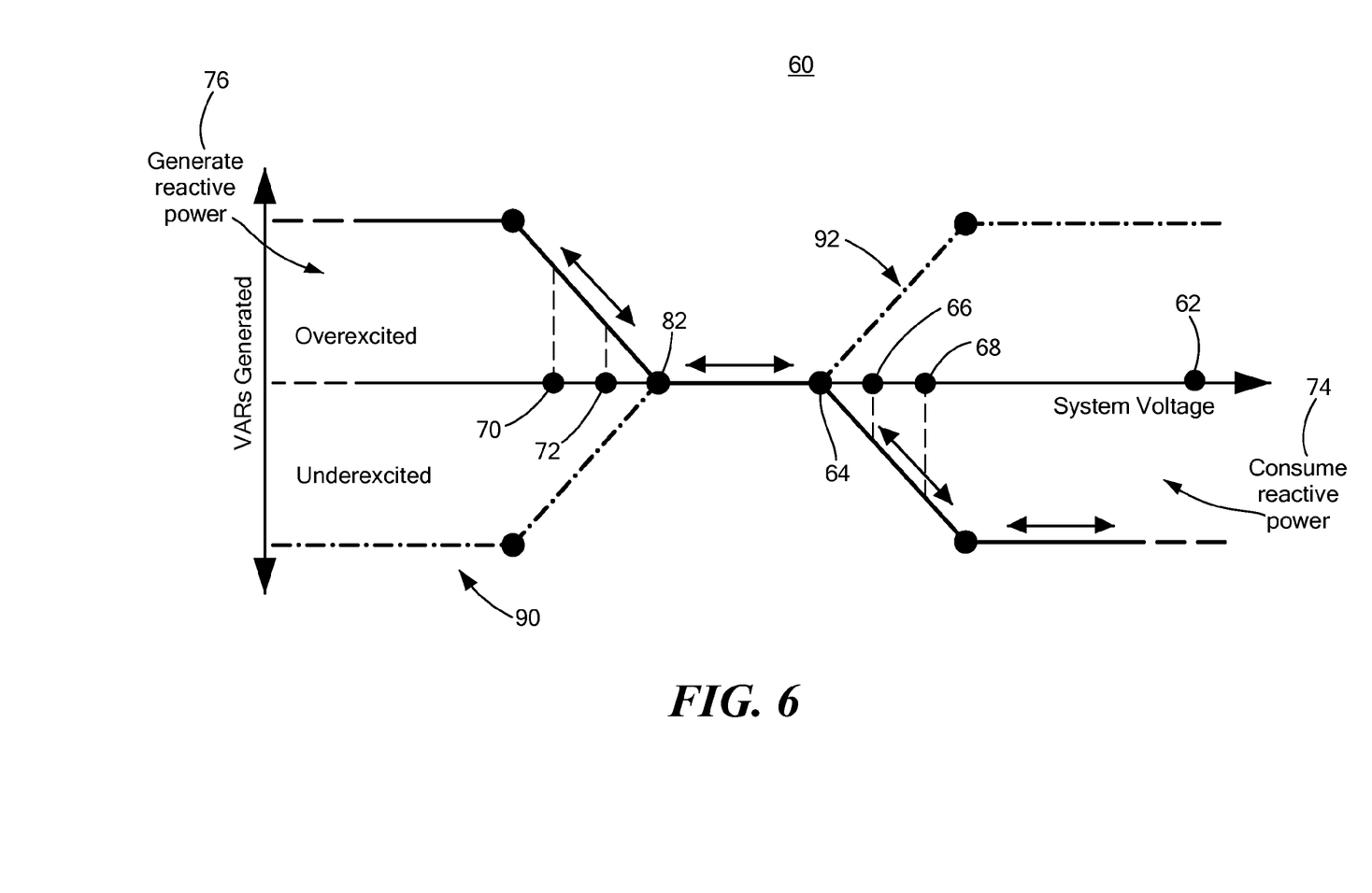
FIG. 6 depicts an example of a volt-VAR curve which may be used by one or more of the inverters shown in FIGS. 1-3.

One or more voltage regulators 12, 12', 12", FIGS. 1-3, are preferably configured to increase output control voltages 22, 22', 22", respectively, such that one or more of inverters 18 associated with a particular voltage regulator consumes reactive power, consumes more reactive power, or generates less reactive power. For example, as shown by volt-VAR curve 60, FIG. 1, shown in greater detail in FIG. 6, for a typical inverter 18, FIGS. 1-3, that generates or consumes reactive power as a function of observed voltage, when output control voltage 22, 22', 22" output by one or more voltage regulators 12, 12', 12" is increased, the voltage observed by one or more inverters 18, shown here as system voltage 62, FIG. 6, is increased. This causes one or more inverters 18 to either consume reactive power, e.g., one or more output control voltages 22, 22', 22" increases system voltage 62 observed by the respective one or more of inverters 18 from the voltage indicated at 64 to the voltage indicated at 66, consume more reactive power, e.g., one or more output control voltages 22, 22', 22" increases system voltage indicated at 66 to the voltage indicated at 68, or generates less reactive power, e.g., one or more output control voltages 22, 22', 22" increase the voltage indicated at 70 to the voltage indicated at 72.

To clarify, as shown in volt-VAR curve 60, when system voltage 62 observed by one or more inverters 18, FIGS. 1-3, is greater than the voltage indicated at point 64, FIG. 6, one or more inverters 18 will consume reactive power, indicated at 74. When system voltage 62 is less than the voltage indicated at point 82, one or more inverters 18 will generate reactive power, indicated at 76. In the examples shown in FIGS. 1 and 3, there may be multiple inverters 18 on secondary feeder 16 at various states of not consuming reactive power, already consuming reactive power, or generating reactive power. The same holds true for multiple inverters 18 on distribution feeder 36, FIG. 2, and high voltage feeder 30.

Thus, voltage regulators 12, 12', 12", FIGS. 1-3, increase their respective output control voltages such that one or more of inverters 18 consumes reactive power, consumes more reactive power, or generates less reactive power.

In another embodiment, one or more voltage regulators 12, 12', 12", FIGS. 1-3, may be configured to decrease their respective output control voltages 22, 22', 22" such that one or more inverters 18, FIGS. 1-3, generate reactive power, generate more reactive power, or consume less reactive power. For example, when one or more of output control voltages 22, 22', 22" output by regulators 12, 12', 12", respectively, is lowered, it lowers the voltage observed by the one or more inverters 18, e.g., from the voltage indicated at 82 to the voltage indicated at 72 so that one or more inverters 18 generate reactive power, indicated at 76. Similarly, one or more of output control voltages 22, 22', 22" may lower system voltage 62 observed by the respective one or more inverters 18 from the voltage indicated at 72 to the voltage indicated at 70 such that one or more inverters generate more reactive power. Output control voltages 22, 22', 22" may also decrease system voltage 62 observed by one or more inverters 18 from the voltage indicated at 68 to the voltage indicated at 66 so that the respective one or more inverters 18 consume less reactive power.

Although as discussed above with reference to FIG. 6, volt-VAR curve 60 is shown to consume reactive power at higher system voltages 62, e.g., indicated at 74 and generate reactive power at lower system voltages, e.g., as indicated at 76, in other examples, the volt-VAR curve may be reversed, as indicated by the dashed lines indicated at 90 and 92. In this example, one or more voltage regulators 12, 12', 12" preferably increase the output control voltages 22, 22', 22" such that one or more of inverters 18 generate reactive power, generates more reactive power, or consumes less reactive power. Similarly, when volt-VAR curve 60 is reversed, one or more voltage regulators 12 may lower output control voltages 22, 22', 22" such that one or more inverters 12 consume reactive power, consume more reactive power, or generate less reactive power. In other examples, the shape of volt-VAR curve 60 may differ entirely from volt-VAR curve 60 shown in FIG. 6, e.g., as determined by a manufacturer of one or more inverters 18. In this example, volt-VAR curve 60 may have more or less straight line segments or be based on actual curve (non-linear segments), as known by those skilled in the art.

Thus, system 10, FIGS. 1-6, with one or more voltage regulators 12, 12', 12" effectively controls the reactive power flow of one or more inverters 18 on the various feeders (high voltage feeder 30, distribution feeder 36, and secondary feeder 16) of electrical grid 20, FIG. 2. This provides system 10 with the ability to change the voltage on feeders 16, 30, and 36 of electrical grid 20, change both real and reactive power on feeders 16, 30, and 36, minimize power loss on electrical grid 20, increase headroom, increase stability, and decrease response time to changing conditions on electrical grid 20. The result is system 10 provides the utilities with a fast, stable, predictable, and precise control of reactive power output of inverters that generate or consume reactive power as a function of observed voltage, even if the inverters are not owned by the utility which operates and/or owns electrical grid 20. Therefore, the reactive power output of one or more inverters 18, FIGS. 1-3, can be controlled more precisely and can reach the desired values faster. The reactive power output can be controlled by the utility even if one or more inverters 18 are not owned by the utility (discussed below). Additionally, system 10 can mitigate situations where the reactive power of one or more inverters becomes unstable and oscillatory.

In one example, each of the one or more voltage regulators 12, 12', 12", FIGS. 1-3, are configured to set their respective one or more output control voltages 22, 22', 22" to a predetermined voltage to control the reactive power flow of one or more inverters 18. In one design, system 10, FIGS. 1-3, may include communication subsystem 100 configured to communicate the one or more predetermined voltages to one or more voltage regulators 12, 12', 12", e.g., preferably from an electrical grid control center, such as distribution operation control center 110, FIG. 2, which communicates the predetermined voltages to each of the voltage regulators 12, 12', 12", as shown by the dashed lines.

Similarly, voltage regulators 12, 12', 12", FIGS. 1-3, may be configured to set one or more output control voltages 22, 22', 22", respectively, based on reactive power flow measurements at one or more points of the feeder, e.g., secondary feeder 16, distribution feeder 36, or high voltage feeder 30, FIGS. 1-3, to control the reactive power flow of one or more inverters 18. For example, the reactive power flow may be measured at points 112, FIG. 3, nodes 94 and 98, or points 120, FIG. 2, of secondary feeder 14. The same holds true for high voltage feeder 30, FIG. 2, and a distribution feeder 36, e.g., at point 122 of distribution feeder 36 or at points 124, 126 of high voltage feeder 30. Similarly, communication subsystem 100 may be used to communicate the one or more desired values or range of values of the reactive power flow to one or more voltage regulators 12, 12', 12". The desired values or desired range of values of the respective power flows may also be communicated to communication subsystem 100 by electrical grid control center 110, FIG. 2.

In one example, one or more of voltage regulators 12, 12', 12", FIGS. 1-3, may be configured to iteratively adjust one or more output control voltages 22, 22', 22", respectively, based on a series of reactive power flow measurements at one or more points of the feeder to control the reactive power flow of the one or more inverters.

For enablement purposes only, the following code portion is provided which can be executed by computing device or processor subsystem 140 preferably included in voltage regulator 12, 12', 12", FIG. 3, or provided by electrical grid control center 110, FIG. 2, or one or more inverters 18, to carry out the primary steps and/or functions of one or more voltage regulators 12, 12', 12" discussed above and recited in the claims hereof. Other equivalent algorithms and code can be designed by a software engineer or programmer skilled in the art using the information provided here.

1. Electric Grid Control Center pre-determines one or more output control voltages for one or more voltage regulators.
2. Electric Grid Control Center communicates the one or more pre-determined output control voltages to one or more voltage regulators, via communication subsystem.
3. The one or more voltage regulators set their output control voltages to the communicated values.
4. One or more inverters regulate their reactive power flows based on the output control voltages of the voltage regulators.

Figure 7:
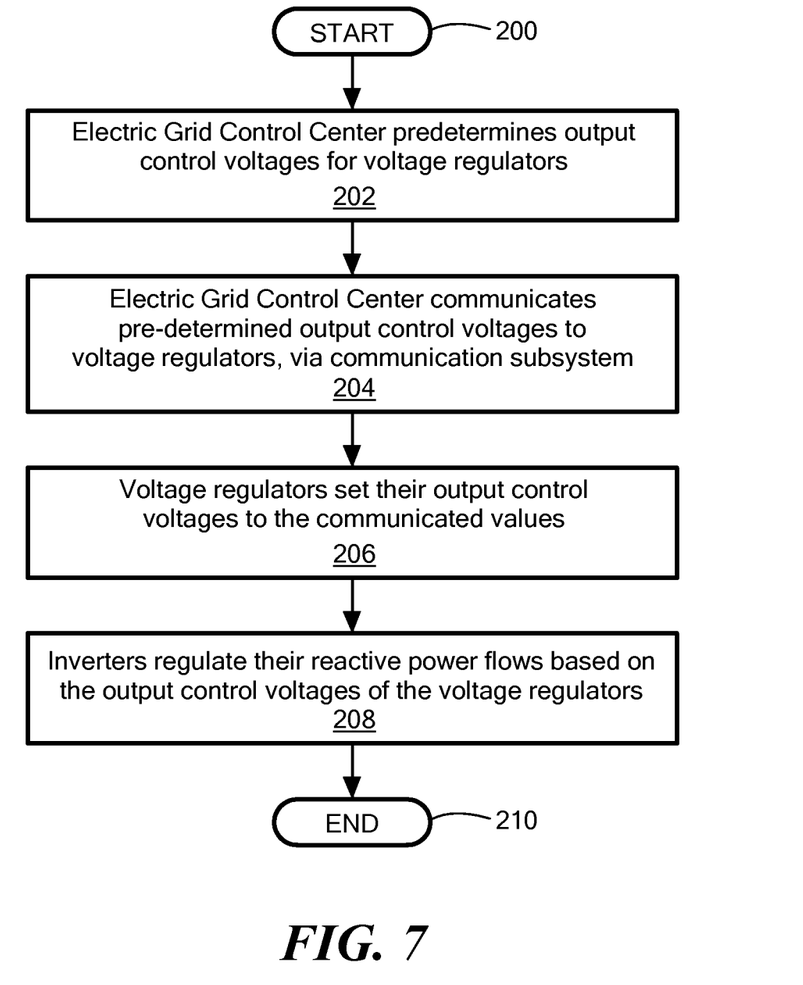
FIG. 7 is a flowchart showing the primary steps of one embodiment of the system and method for regulating the reactive power flow of one or more inverters shown in of FIGS. 1-6.

In the example shown in FIG. 7, the program is started, step 200. Electrical grid control center 110, FIG. 2, predetermines output control voltages 22, 22', 22", FIGS. 1-3, for the respective voltage regulators 12, 12', 12", step 202. Electrical grid control center 110 then communicates the predetermined output control voltages to one or more voltage regulators 12, 12', 12" via communication subsystem 100, step 204, FIG. 7. The one or more voltage regulators 18 set their respective output control voltages 22, 22', 22", to the communicated values, step 206. The one or more inverters 18 then regulate their respective power flow based on the output control voltages 22, 22', 22" of voltage regulators 12, 12', 12", step 208. The program then ends, step 210.

For enablement purposes only, the following code portion is provided which can be executed by computing device or processor subsystem 140 preferably included in voltage regulator 12, 12', 12", FIG. 3, or provided by electrical grid control center 110 or one or more inverters 18 to carry out the primary steps and/or functions of one or more voltage regulators 12, 12', 12" discussed above and recited in the claims hereof. Other equivalent algorithms and code can be designed by a software engineer or programmer skilled in the art using the information provided here.

1. Electric Grid Control Center determines desired values or desired ranges of values of reactive power flow.
2. Electric Grid Control Center communicates the desired values or desired ranges of values reactive power flow to one or more voltage regulators, via communication subsystem.
3. The one or more voltage regulators set their output control voltages based on (1) one or more reactive power flow measurements at one or more points of the feeder, and (2) the desired values or ranges of values of reactive power flow as communicated via communication subsystem.
4. One or more inverters regulate their reactive power flows based on the output control voltages of the voltage regulators.

Figure 8:
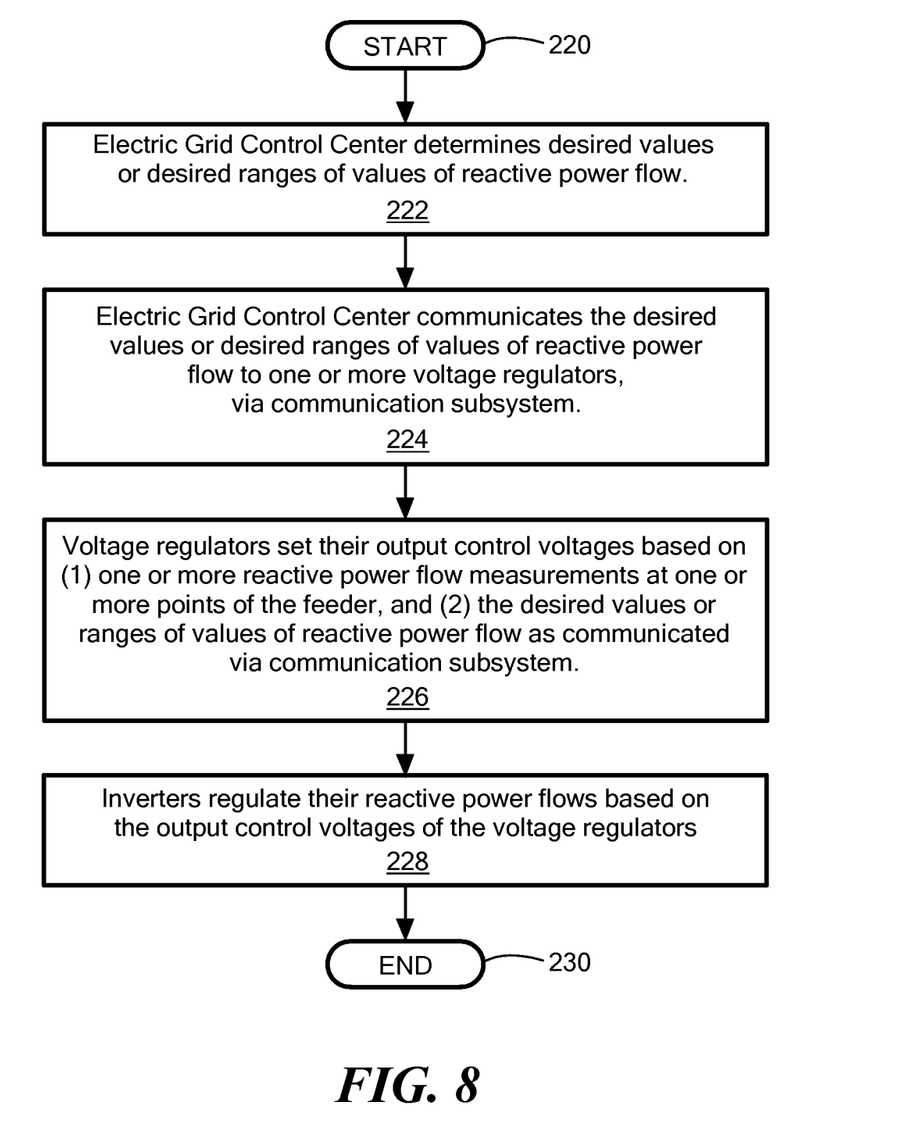
FIG. 8 is a flowchart showing the primary steps of another embodiment of the system and method for regulating the reactive power flow of one or more inverters shown in of FIGS. 1-6.

In this example, as shown in FIG. 8, the program is started, step 220. Electrical grid control center 110, FIG. 2, determines desired values or desired range of values of reactive power flow, step 222, FIG. 8. Electrical grid control center 110 then communicates the desired values or desired range of values of reactive power flow to one or more voltage regulators 12, 12', 12" via communication subsystem 100, step 224. The one or more voltage regulators 12, 12', 12", FIGS. 1-3, then set their respective output control voltages based on: 1) one or more reactive power flow measurements at one or more points of the feeder, e.g., points 124, 126 of high voltage feeder 30, FIG. 2, points 122 of distribution feeder 36, points 120 of secondary feeder 16, points 112, FIG. 3, or nodes 94, 96, and 98, and 2) the desired values or range of values of reactive power flow as communicated via communication subsystem 100, FIG. 2, step 226, FIG. 8, as discussed in further detail below with reference to FIGS. 9 and 10. One or more inverters 18 regulate their reactive power flows based on the output control voltages of the one or more voltage regulators 12, 12', 12", step 228. The program then ends, step 230.

For enablement purposes only, the following code portion is provided which can be executed by computing device or processor subsystem 140 preferably included in voltage regulator 12, 12', 12", FIG. 3, to carry out the primary steps and/or functions of one or more voltage regulators 12, 12', 12" discussed above and recited in the claims hereof. Other equivalent algorithms and code can be designed by a software engineer or programmer skilled in the art using the information provided here.

1) The voltage regulator obtains or calculates a range of reactive power flow values, from Qmin to Qmax, where Qmax>=Qmin. Each value can be positive or negative (or zero), with the sign denoting the direction of the net reactive power flow.
2) Net reactive power flow Q is measured at a point of the feeder. The value of Q can be positive or negative (or zero), with the sign denoting the direction of the net reactive power flow.
3) if Q is within the range Qmin to Qmax, do not change the output control voltage. Go to step 2 (after an optional delay).
4) If Q is outside the range Qmin to Qmax, modify the output control voltage.
   a. In one embodiment, if Q>Qmax, increase the output control voltage.
   b. In one embodiment, if Q>Qmax, decrease the output control voltage.

c. In one embodiment, if Q<Qmin, increase the output control voltage.

d. In one embodiment, if Q<Qmin, decrease the output control voltage.

5) In all examples, there may be an optional voltage range, Vmin to Vmax, so that the voltage will not be modified to be beyond this range.

6) Optionally, measure the net reactive power flow Q again. If Q has moved further away from the Qmin to Qmax range, or if Q has not changed, then optionally restore the original output control voltage.

7) Go to step 2 (after an optional delay).

Figure 9:
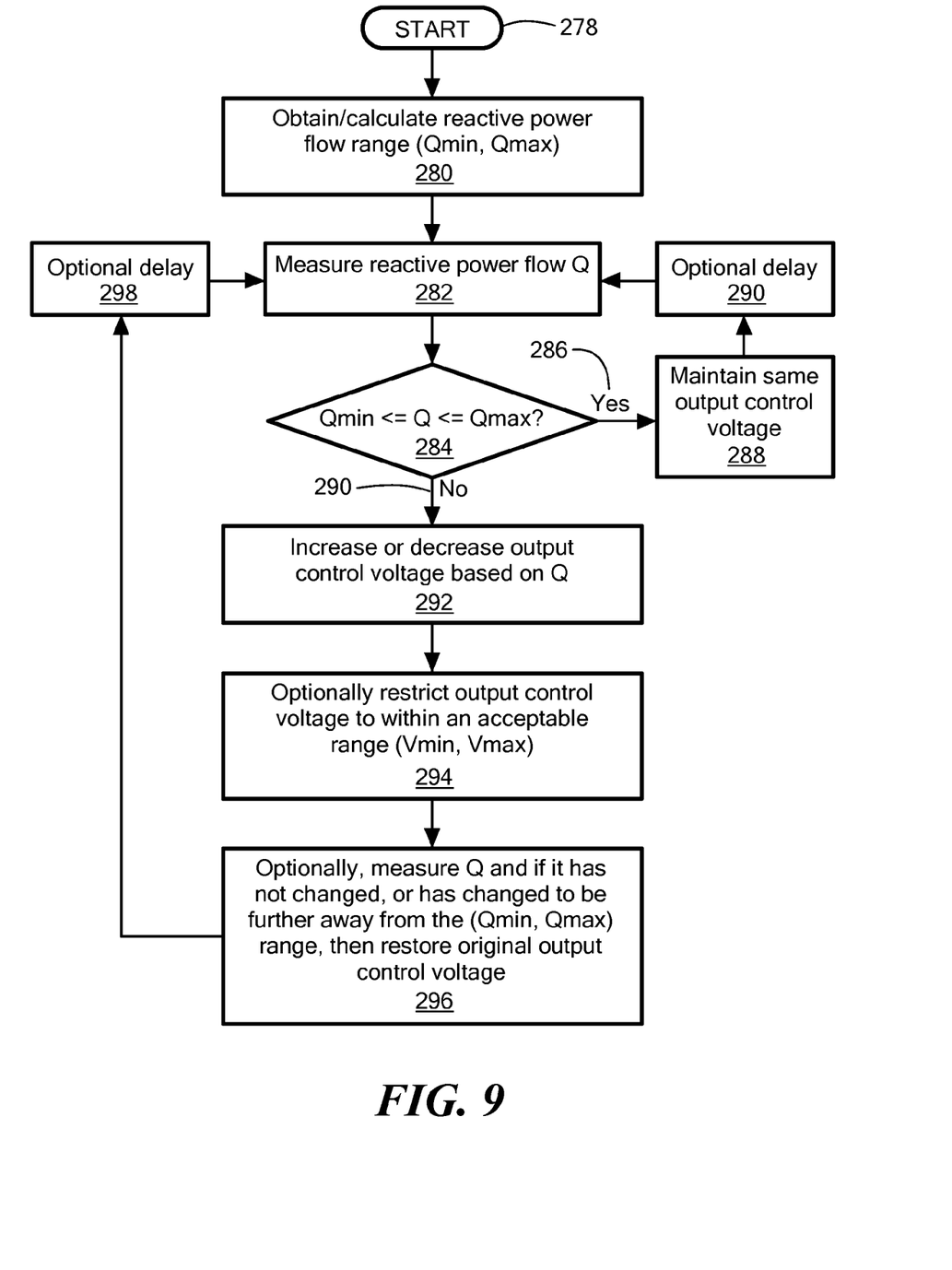
FIG. 9 is a flowchart showing the primary steps of another embodiment of the system and method for regulating the reactive power flow of one or more inverters shown in of FIGS. 1-6.

In this example as shown in FIG. 9, the program is started, step 278. The one or more voltage regulators 12, 12', 12", obtain or calculate a range of reactive power flows ranging from $Q_{min}$ to $Q_{max}$, step 280. Each value can be positive or negative (or zero) with the sign denoting the direction of the net reactive power flow. The net reactive power flow Q is measured at a point of one or more of high voltage feeder 30, distribution feeder 36 and/or secondary feeder 16, e.g., any of points 112, 120, 122, 124 or nodes 94, 96, and 98, as discussed above, FIGS. 2-3, step 282, FIG. 9. The value of Q can be positive or negative (or zero) with the sign denoting the direction of the net reactive power flow. A determination is made if Q is within the range of $Q_{min}$ to $Q_{max}$, step 284. If Q is within the range $Q_{min}$ to $Q_{max}$, output control voltages 22, 22', 22" are not changed, step 286, and the same output control voltages are maintained, step 288. An optional delay may be provided, step 290, and steps 282-284 are repeated. If Q is outside of the range $Q_{min}$ to $Q_{max}$, one or more of output control voltage 22, 22', 22" are increased or decreased based on Q, step 292. In one example, if $Q>Q_{max}$, one or more output control voltages 22, 22', 22" may be increased. In another example, if $Q>Q_{max}$, one or more output control voltages 22, 22', 22" may be decreased. In yet another example, if $Q<Q_{min}$, one or more output control voltages 22, 22', 22" may be increased. In yet another example, if $Q<Q_{min}$, one or more output control voltages 22, 22', 22" may be decreased. In the previous examples, there may be an optional voltage range, $V_{min}$ to $V_{max}$ so that a voltage will not be modified beyond this range, step 294. Optionally, the net reactive power flow Q may be measured again. If it has not changed or changed to be further away from range of $Q_{min}$ to $Q_{max}$, then control voltages 22, 22', 22" are restored to their original value, step 296. An optional delay may be provided, step 298, and steps 282-296 may be repeated.

For enablement purposes only, the following code portion is provided which can be executed by computing device or processor subsystem 140 preferably included in voltage regulator 12, 12', 12", FIG. 3, to carry out the primary steps and/or functions of one or more voltage regulators 12, 12', 12" discussed above and recited in the claims hereof. Other equivalent algorithms and code can be designed by a software engineer or programmer skilled in the art using the information provided here.

1) The voltage regulator obtains or calculates a range of reactive power flow values, from Qmin to Qmax, where Qmax>=Qmin. Each value can be positive or negative (or zero), with the sign denoting the direction of the net reactive power flow.

2) Reactive power flow measurements Q1, Q2, . . . Qn are taken at several points of the feeder. Compute the sum using the formula:

$$Q = Q_1 + Q_2 + \ldots + Q_n \quad (1)$$

The value of Q can be positive or negative (or zero), with the sign denoting the direction of the net reactive power flow.

3) If Q is within the range Qmin to Qmax, do not change the output control voltage. Go to step 2 (after an optional delay).

4) If Q is outside the range Qmin to Qmax, modify the output control voltage.

a. In one embodiment, if Q>Qmax, increase the output control voltage.

b. In one embodiment, if Q>Qmax, decrease the output control voltage.

c. In one embodiment, if Q<Qmin, increase the output control voltage.

d. In one embodiment, if Q<Qmin, decrease the output control voltage.

5) In all examples, there may be an optional voltage range, Vmin to Vmax, so that the voltage will not be modified to be beyond this range.

6) Optionally, measure the reactive power flows Q1, Q2, . . . Qn again and compute their sum Q=Q1+Q2+ . . . +Qn again. If Q has moved further away from the Qmin to Qmax range, or if Q has not changed, then optionally restore the original output control voltage.

7) Go to step 2 (after an optional delay).

Figure 10:
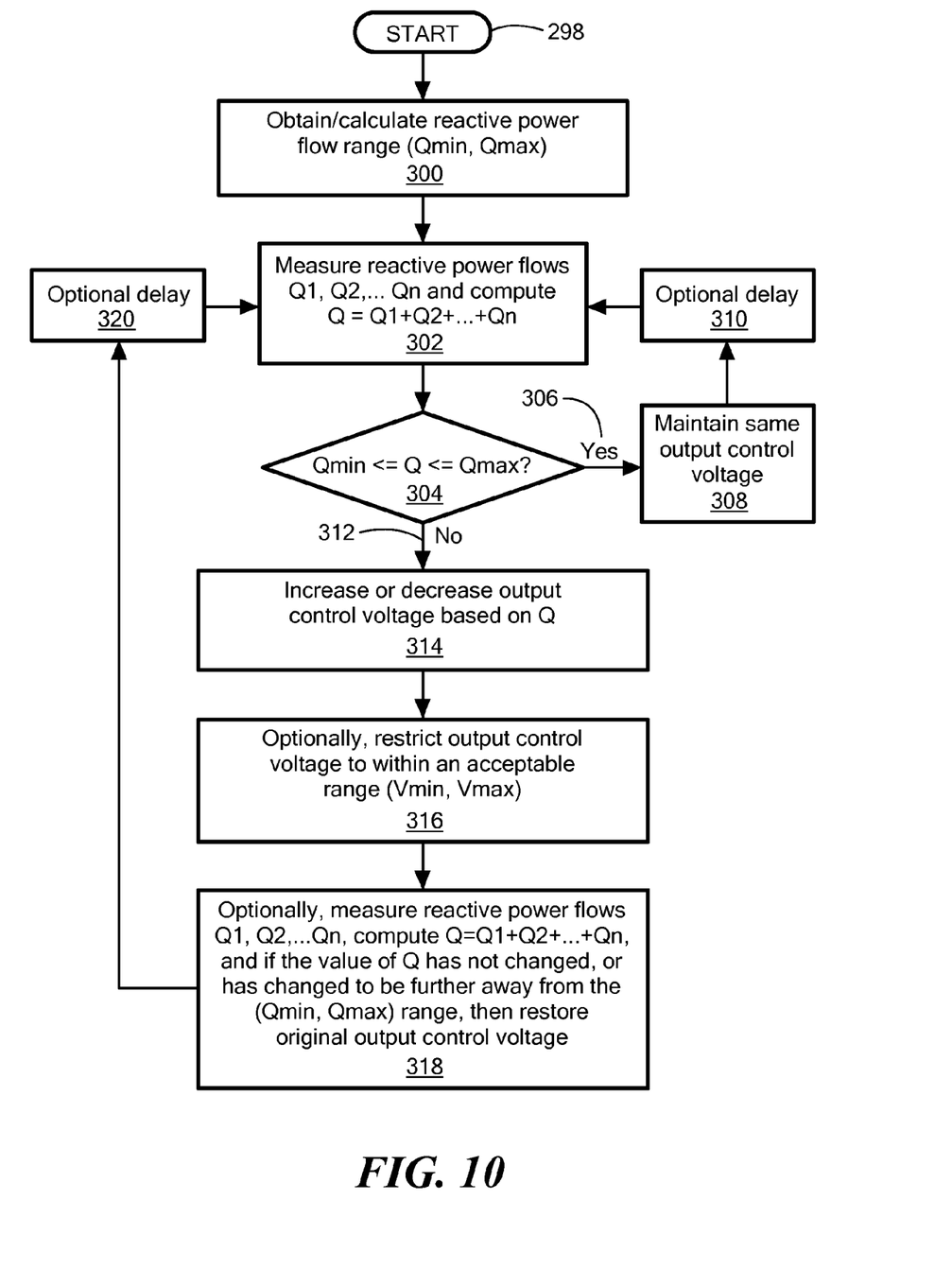
FIG. 10 is a is a flowchart showing the primary steps of another embodiment of the system and method for regulating the reactive power flow of one or more inverters shown in of FIGS. 1-6.

In this example, as shown in FIG. 10, the program is started, step 298. Reactive power flow measurements $Q_1$, $Q_2 \ldots Q_n$ are then taken at several points of high voltage feeder 30, FIG. 2, distribution feeder 36 and/or secondary feeder 16, as discussed above, and the sum of the reactive power flow measurements is then computed, step 302, in accordance with the formula (1) above.

The values of Q can be positive or negative or zero with the sign denoting the direction of the net reactive power flow. A determination is made whether the calculated sum of Q is within the range of $Q_{min}$ to $Q_{max}$, step 304. If Q is within the range, $Q_{max}$ to $Q_{max}$, then no change is made to one or more output control voltages 22, 22', 22", step 306. The same control voltages are maintained, step 308, and an optional delay may be provided, step 310. Steps 302-304 are repeated. If Q is outside the range $Q_{min}$ to $Q_{min}$, step 314, one or more output control voltages 22, 22', 22" are increased or decreased based on Q, step 314. In one example, if the calculated sum of $Q>Q_{max}$, one or more output control voltages 22, 22', 22" may be increased. In another example, if the calculated sum of $Q>Q_{max}$, one or more output control voltages 22, 22', 22" may be decreased. In yet another example, if $Q<Q_{min}$, output control voltages 22, 22', 22" may be increased. In yet another example, if the calculated sum of $Q<Q_{min}$, one or more output control voltages 22, 22', 22" may be decreased. In the previous examples, there may be an optional voltage range, $V_{min}$ to $V_{max}$ so that a voltage will not be modified beyond this range, step 316. Optionally, the reactive power flows, $Q_1, Q_2 \ldots Q_n$, can be measured again and sum Q may be calculated again using formula (1) above, step 318. If the calculated sum of Q has moved further away from the range $Q_{min}$ to $Q_{max}$, or if the calculated sum of Q has not changed, then the original value of output control voltages 22, 22', 22" may be restored, step 318. An optional delay may be provided, step 320, and steps 302-320 may be repeated.

As will be appreciated by one skilled in the art, one or more embodiments of this invention may be embodied as a system, method or a computer program product. One or more embodiments this invention may take the form of hardware, software (including firmware, resident software, micro-code, and the like) or a combination of both hardware and software that may all generally be referred to herein as a "module", "engine" or "system." One or more embodiments of this invention may take the form of a computer program product embodied in one or more computer-readable medium(s) having computer readable program code/ instructions embodied thereon.

Any combination of computer-readable media or memory may be utilized. The computer-readable media or memory may be a computer-readable signal medium or a computer-readable storage medium. A computer-readable storage medium or memory may be, an electronic, magnetic, optical, electromagnetic, infrared, or semiconductor system, apparatus, or device, or any suitable combination of the foregoing. Other examples may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. As disclosed herein, the computer-readable storage medium or memory may be any tangible medium that can contain, or store one or more programs for use by or in connection with one or more processors on a company device such as a computer, a tablet, a cell phone, a smart device, or similar type device.

Computer program code for the one or more programs for carrying out the instructions or operation of one or more embodiments of this invention may be written in any combination of one or more programming languages, including an object oriented programming language, e.g., C++, Smalltalk, Java, and the like, and conventional procedural programming languages, such as the "C" programming language or similar programming languages. The program code may execute on one or more of processor subsystem 140 included in voltage regulators 12, 12', 12", as shown and discussed above with reference to one or more of FIGS. 1-8.

One of more embodiments of this invention are disclosed above with reference to flowchart illustrations and/or block diagrams of methods, systems and computer program products. Each block of the flowchart illustrations and/or block diagrams shown in one or more of FIGS. 1-10, and combinations thereof may be implemented by computer program instructions. These computer program instructions may be provided to a processor of a general purpose computer, a processor included in one or more voltages regulators 12, 12', 12", special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A system for regulating reactive power flow of one or more inverters coupled to an electrical grid, the system comprising:
   one or more voltage regulators coupled between a voltage output of a feeder of the electrical grid and one or more inverters configured to generate or consume reactive power as a function of observed voltage, the one or more voltage regulators configured to provide one or more output control voltages to control reactive power flow of the one or more inverters.

2. The system of claim 1 in which the one or more inverters are non-responsive to reactive power commands.

3. The system of claim 1 in which the one or more voltage regulators is configured to set its respective one or more output control voltages to one or more predetermined voltages to control the reactive power flow of the one or more inverters.

4. The system of claim 3 further including a communication subsystem configured to communicate the one or more predetermined voltages to the one or more voltage regulators.

5. The system of claim 4 in which the one or more predetermined voltages is communicated to the communication subsystem by an electrical grid control center.

6. The system of claim 1 in which the one or more voltage regulators is configured to set the one or more output control voltages based on a reactive power flow measurement at one or more points of the feeder to control the reactive power flow of the one or more inverters.

7. The system of claim 6 further including a communication subsystem configured to communicate one or more desired values or desired ranges of values of the reactive power flow to the one or more voltage regulators.

8. The system of claim 7 in which the one or more desired values or desired ranges of values of the reactive power flow are communicated to the communication subsystem by an electrical grid control center.

9. The system of claim 1 in which the one or more voltage regulators is configured to iteratively adjust the one or more output control voltages based on a series of reactive power flow measurements at one or more points of the feeder to control the reactive power flow of the one or more inverters.

10. The system of claim 1 in which the one or more voltage regulators is configured to increase the one or more output control voltages such that one or more of the one or more inverters consumes reactive power, consumes more reactive power, or generates less reactive power.

11. The system of claim 1 in which the one or more voltage regulators is configured to lower the one or more output control voltages such that one or more of the one or more inverters generates reactive power, generates more reactive power, or consumes less reactive power.

12. The system of claim 1 in which the one or more voltage regulators is configured to increase the one or more output control voltages such that one or more of the one or more inverters generates reactive power, generates more reactive power, or consumes less reactive power.

13. The system of claim 1 in which the one or more voltage regulators is configured to lower the one or more output control voltages such that one or more of the one or more inverters consumes reactive power, consumes more reactive power, or generates less reactive power.

14. The system of claim 1 in which the feeder includes a secondary feeder.

15. The system of claim 1 in which the feeder includes a distribution feeder.

16. The system of claim 1 in which the feeder includes a high voltage feeder.

17. The system of claim 1 in which the one or more voltage regulators includes a low voltage regulator.

18. The system of claim 1 in which the one or more voltage regulators includes a medium voltage regulator.

19. The system of claim 1 in which the one or more voltage regulators includes a high voltage regulator.

20. The system of claim 1 in which the one or more voltage regulators include a computer subsystem configured to set the output control voltage.

21. A method executed on one or more processors for regulating the reactive power flow of one or more inverters coupled to an electrical grid, the method comprising:
receiving a voltage output from a feeder of an electrical grid; and
converting the voltage output from the feeder of the electrical grid to one or more output control voltages, the one or more output control voltages configured to control the reactive power flow of one or more inverters configured to generate or consume reactive power as a function of the output control voltage.

22. The method of claim 21 in which the one or more inverters are non-responsive to reactive power commands.

23. The method of claim 21 further including setting the one or more output control voltages to one or more predetermined voltages to control reactive power flow of the one or more inverters.

24. The method of claim 23 further including communicating the one or more predetermined voltages to the one or more voltage regulators.

25. The method of claim 24 in which the one or more predetermined voltages is communicated by an electrical grid control center.

26. The method of claim 21 further including setting the one or more predetermined voltages based on a reactive power flow measurement at one or more points of the electrical grid to control reactive power flow of the one or more inverters.

27. The method of claim 26 further including communicating one or more desired values or desired ranges of values of the reactive power flow to the one or more voltage regulators.

28. The method of claim 27 in which one or more desired values or desired ranges of values of reactive power flow are communicated by an electrical grid control center.

29. The method of claim 21 further including iteratively adjusting the one or more output control voltages based on a series of reactive power flow measurements at one or more points of the electrical grid to control the reactive power of the one or more inverters.

30. The method of claim 21 further including increasing the one or more output control voltages such that one or more of the one or more inverters consumes reactive power, consumes more reactive power, or generates less reactive power.

31. The method of claim 21 further including lowering the one or more output control voltages such that one or more of the one or more inverters generates reactive power, generates more reactive power, or consumes less reactive power.

32. The method of claim 21 further including increasing the one or more output control voltages such that one or more of the one or more inverters generates reactive power, generates more reactive power, or consumes less reactive power.

33. The method of claim 21 further including lowering the output control voltage such that one or more of the one or more inverters consumes reactive power, consumes more reactive power, or generates less reactive power.

34. A method for regulating the reactive power flow of one or more inverters coupled to an electrical grid, the method comprising:
one or more programs, wherein the one or more programs are stored in a memory and configured to be executed by one or more processors, the programs including instructions to:
receive a voltage output from a feeder of an electrical grid; and
convert the voltage output from the feeder of the electrical grid to the one or more output control voltages, the one or more output control voltages configured to control the reactive power flow of one or more inverters configured to generate or consume reactive power as a function of the output control voltage.

35. A computer program product having program code stored on a non-transitory computer-readable medium, which when executed by at least one computing device causes at least one computing device to generate instructions to:
receive a voltage output from a feeder of an electrical grid; and
convert the voltage output from the feeder of the electrical grid to the one or more output control voltages, the one or more output control voltages configured to control the reactive power flow of one or more inverters configured to generate or consume reactive power as a function of the output control voltage.

* * * * *